United States Patent Office 3,441,592
Patented Apr. 29, 1969

3,441,592
ARYLIMINO CHLOROCARBONYL CYANIDES AND PREPARATION THEREOF
Eberhart Degener, Opladen, and Hans Holtschmidt, Leverkusen, Germany, assignors to Farbenfabriken Bayer Aktiengesellschaft, Leverkusen, Germany, a corporation of Germany
No Drawing. Filed Dec. 13, 1965, Ser. No. 513,596
Claims priority, application Germany, Apr. 14, 1965,
F 48,514
Int. Cl. C07c *121/02, 121/66, 121/78*
U.S. Cl. 260—465          11 Claims

ABSTRACT OF THE DISCLOSURE

Arylimino chlorocarbonyl cyanides are prepared by reacting an aryl isothiocyanate adduct with at least a stoichiometric amount of a chlorinating agent exemplified by chlorine. The corresponding arylimino chlorocarbonyl cyanides of the formula

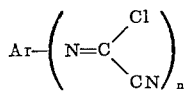

wherein $n$ is 1–2; and
Ar is an aryl radical selected from the group consisting of phenyl, naphthyl, diphenyl, and corresponding substituted compounds containing as substituents a member selected from the group consisting of fluoro, chloro, bromo, nitro, alkyl having 1–4 carbon atoms, trifluoro methyl, alkoxy having 1–4 carbon atoms, alkylmercapto having 1–4 carbon atoms, CN, COOR in which R is alkyl having 1–4 carbon atoms and alkylsulphone having 1–4 carbon atoms are useful as insecticides and intermediates for plant protection agents.

---

It has been found that arylamino-chlorocarbonyl cyanides can be obtained by reacting adducts of hydrogen cyanide with arylisothiocyanates of the general formula $$Ar-(NH-\underset{\underset{S}{\|}}{C}-CN)_n$$

wherein $n=1$ or 2 and Ar represents an aryl radical preferably a phenyl, naphthyl or diphenyl radical, which may, if desired, be mono- or polysubstituted by the same or different radicals such as fluorine, chlorine, bromine, nitro, alkyl (with 1 to 4 carbon atoms), trifluoromethyl, alkoxy (1 to 4 carbon atoms), alkylmercapto (1 to 4 carbon atoms), CN, COOR (R=alkyl with 1 to 4 carbon atoms), an alkyl sulphone group (alkyl=1 to 4 carbon atoms), with chlorine or chlorine-yielding compounds.

Since the HCN-adducts of arylisothiocyanates are known to split readily into their components, it is surprising that the labile cyano group is not chlorolytically split off during this reaction. Suitable starting compounds for the process, which are prepared by known methods include, for example, N-phenyl-; N-4-chlorophenyl-; N-4-bromophenyl-; N-4-fluorophenyl-; N-2-cyano-4-chlorophenyl-; N-2,4-dichlorophenyl-; N-2,3-dichlorophenyl-; N-3,4-dichlorophenyl-; N-2,5-dichlorophenyl-; N-3,5-dichlorophenyl-; N-2,4,6-trichlorophenyl-; N-3,4,6-trichlorophenyl-; N-pentachlorophenyl-; N-2-, -3- or -4-nitrophenyl-; N-4-chloro-2-nitrophenyl-; N-3- or -4-cyanophenyl-; N-4-methylsulphonylphenyl-; N-4-methoxyphenyl-; N-4-butoxyphenyl-; N-4-methylmercaptophenyl-; N-4-methylphenyl-; N-4-nitro-1-methylphenyl-; N-3-trifluoromethylphenyl-; N-2-trifluoromethyl-4-chlorophenyl-; N-2-cyano-4-nitrophenyl-; N-2-chloro-4-carbethoxyphenyl or N-4-tert.-butylphenylcyanocarbonic acid thioamide; N-4-trichloromethyl-1- or -2-naphthyl-; N-4-ethoxy-1-naphthylcyanocarbonic acid thioamide; N-diphenyl-cyanocarbonic acid thioamide; N,N'-phenylene-1,4-bis- or N,N'-toluylene-1,4-bis-cyanocarbonic acid thioamide.

Apart from chlorine, suitable chlorinating agents include, for example, phosphorus pentachloride, sulphuryl chloride and phosgene. In some instances, it is advantageous to carry out the reaction in the presence of chlorination activators such as, for example, $PCl_3$ in cases where chlorine is used, or dimethyl formamide in cases where phosgene is used as the chlorinating agent.

The process according to the invention is explained with reference to the example of the reaction between N-2,4,6-trichlorophenylcyanocarbonic acid thioamide with chlorine:

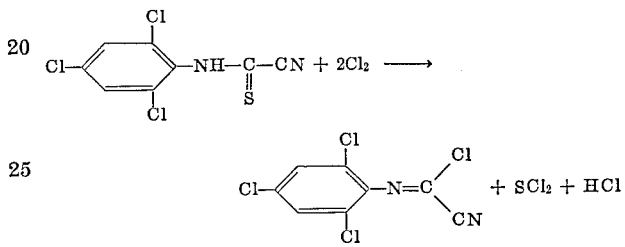

The reaction may be carried out either in the presence or in the absence of a solvent. Where the reaction is carried out in the presence of a solvent, inert organic solvents such as hydrocarbons, for example light petrol, pentane, hexane, isooctane, benzene, toluene or xylene; chlorinated hydrocarbons such as dichloroethylene, chloroform, carbon tetrachloride or chlorobenzene; ethers such as diethyl ether, dioxan or tetrahydrofuran or esters such as methyl acetate and ethyl acetate can be used. It is also possible, however, to use inorganic solvents, for example, phosphorus trichloride, phosphorus oxychloride or phosphorus sulphochloride.

The reaction is carried out at temperatures in the range from 0 to 120° C. In cases where the process is carried out using chlorine, phosphorus pentachloride or sulphuryl chloride, the chlorinating agent is preferably used in a stoichiometric quantity. It is also possible, however, to use the chlorinating agent in excess, in cases where the nucleus of the aryl radical is not chlorinated under the reaction conditions. In cases where phosgene is used as the chlorinating agent, it is preferably employed in a quantity in excess of the stoichiometric quantity in order to obtain favourable yields.

The process may be carried out for example, by adding phosphorus pentachloride to a suspension or solution of the HCN-adduct, and heating the mixture until no more HCl is given off. Alternatively, the HCN-adduct may be converted into the aryliminochlorocarbonyl cyanide by reaction with chlorine either at room temperature or at slightly elevated temperature. Furthermore, the solution of an HCN-adduct may be added to a solution of excess phosgene, and the reaction completed by the introduction of gaseous phosgene, optionally at elevated temperature.

To carry out the process, the HCN-adduct may be heated together with sulphuryl chloride until formation of the aryliminochlorocarbonyl cyanide is complete.

The reaction time is generally from 30 minutes to 20 hours, preferably from 1 to 8 hours. The reaction products are worked up and isolated by the usual methods.

The novel arylimino-chlorocarbonyl cyanides are valuable intermediates for the preparation of plant-protection agents and exhibit insecticidal activity themselves. In spray tests, 2,4,6 - trichlorophenylimino - chlorocarbonyl cyanide, for example, completely destroyed *Aedes aegypti* when used in a concentration of only 0.001%. The other compounds obtainable by the process exhibit similar activity.

Example 1

A solution of 40 parts by weight of the adduct of hydrogen cyanide with 2,4,6-trichlorophenyl-isothiocyanate, in 200 parts by weight of carbon tetrachloride is saturated at room temperature with chlorine. The solvent and the resulting sulphur dichloride are then distilled off.

The residue is fractionated in vacuo. 33 parts by weight (78% of the theoretical) of 2,4,6-trichloro-phenylimino-chlorocarbonyl cyanide corresponding to the formula

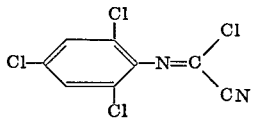

are obtained, B.P. 130 to 140°/0.09 mm. $C_8H_2N_2Cl_4$, molecular weight: 268.

Calculated: C, 35.81%; H, 0.75%; N, 10.45%; Cl, 52.95%. Found: C, 34.96%; H, 0.93%; N, 9.81%; Cl, 53.1%.

Example 2

440 parts by weight of phosphorus pentachloride are introduced at room temperature into a solution of 340 parts by weight of the adduct of hydrogen cyanide with phenyl isothiocyanate in 950 parts by weight of phosphorus sulphochloride. Stirring is continued for 1 hour at room temperature and then at 50° C. until no more gas is evolved. The phosphorus sulphochloride is removed in vacuo and the residue fractionated in vacuo.

305 parts by weight (88% of the theoretical) of phenyl-imino-chlorocarbonyl cyanide corresponding to the formula

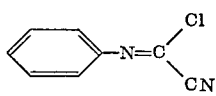

are obtained, B.P. 76° C./0.01 mm. Refractive index $n_{20}=1.5782$. $C_8H_5N_2Cl$, molecular weight=164.5.

Calculated: C, 58.35%; H, 3.04%; N, 17.02%; Cl, 21.58%. Found: C, 58.36%; H, 3.09%; N, 16.98%; Cl, 21.60%.

Example 3

81 parts by weight of the adduct of hydrogen cyanide with phenyl isothiocyanate, are introduced at 0° C. into a solution of 49.5 parts by weight of phosgene in 250 parts by weight of chloroform containing 0.5 part by weight of dimethyl formamide. Stirring is continued for 1 hour at 0 to 10° C. The reaction solution is then boiled, more phosgene being introduced, over a period of 4 hours. After removal of the solvent by distillation, the residue is fractionated in vacuo. 33 parts by weight of phenyl-iminochlorocarbonyl cyanide corresponding to the formula

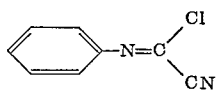

B.P. 124–128° C./24 mm., are obtained.

Example 4

33.8 parts by weight of sulphuryl chloride are added to a suspension of 40.5 parts by weight of the adduct of hydrogen cyanide with phenyl isothiocyanate in 150 parts by weight of carbon tetrachloride. Stirring is continued for three hours under reflux. Following suction-filtration of a fairly small amount of a resinous secondary product, the solvent is removed by distillation and the residue distilled in vacuo. 23 parts by weight of phenyliminochlorocarbonyl cyanide corresponding to the formula

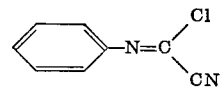

are obtained, B.P. 77–78° C./0.15 mm.

Example 5

Chlorine is introduced over a period of 6 hours at 20° C. into a solution of 40 parts by weight of the adduct of hydrogen cyanide with pentachlorophenyl isothiocyanate in 200 parts by weight of carbon tetrachloride. Chlorination is then continued for another 30 minutes at 50° C., after which the solvent and sulphur dichloride are distilled off.

The reaction product boils at 170° C./0.3 mm. and crystallises on cooling. 28 g. of pentachlorophenylimino-chlorocarbonyl cyanide corresponding to the formula

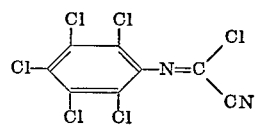

are obtained. Following recrystallization from cyclohexane, the compound melts at 108 to 110° C. $C_8N_2Cl_6$, molecular weight: 336.8.

Calculated: C, 28.53%; N, 8.32%; Cl, 63.16%. Found: C, 28.28%; N, 8.37%; Cl, 62.45%.

Example 6

88 parts by weight of the adduct of hydrogen cyanide with p-tolyl isothiocyanate are introduced at 0° C. into a solution of 49.5 parts by weight of phosgene in 250 parts by weight of chloroform containing 0.5 part by weight of dimethyl formamide. Stirring is continued for 1 hour at 0 to 10° C. The reaction solution is then heated until it boils, and phosgenated for 4 hours under reflux. Following removal of the solvent by distillation, the residue is fractionated. 66 parts by weight of p-tolylimino-chlorocarbonyl cyanide (73.9% of the theoretical) are obtained at 106 to 112° C./0.8 mm. Hg. The compound melts at 21 to 22° C.

*Analysis.*—$C_9H_7N_2Cl$ (Molecular weight: 178.62). Calculated: C, 60.59%; H, 3.95%; N, 15.71%; Cl, 19.88%. Found: C, 60.86%; H, 4.23%; N, 15.16%; Cl, 19.85%.

We claim:
1. An arylimino chlorocarbonyl cyanide of the formula

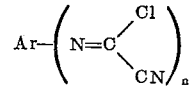

in which
$n$ is 1–2; and
Ar is an aryl radical selected from the group consisting of phenyl, naphthyl, diphenyl, and corresponding substituted compounds containing as substituents, a member selected from the group consisting of fluoro, chloro, bromo, nitro, alkyl having 1–4 carbon atoms, trifluoromethyl, alkoxy having 1–4 carbon atoms, alkylmercapto having 1–4 carbon atoms, CN, COOR in which R is alkyl having 1–4 carbon atoms and alkyl sulphone having 1–4 carbon atoms.

2. The arylimino chlorocarbonyl cyanide of claim 1 wherein $n$ is 1.

3. A compound of claim 1, wherein Ar is phenyl and $n$ is 1.

4. A compound of claim 1, wherein Ar is p-chlorophenyl and $n$ is 1.

5. A compound of claim 1, wherein Ar is p-tolyl and $n$ is 1.

6. A process for preparing an aryl imino chlorocarbonyl cyanide of the formula

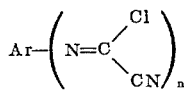

wherein an adduct of hydrogen cyanide with an aryl isothiocyanate of the formula

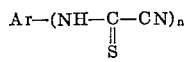

in which
$n$ is 1-2; and
Ar is an aryl radical selected from the group consisting of phenyl, naphthyl, diphenyl, and corresponding substituted radicals containing as substituents a member selected from the group consisting of fluoro, chloro, bromo, nitro, alkyl having 1-4 carbon atoms, trifluoro methyl, alkoxy having 1-4 carbon atoms, alkylmercapto having 1-4 carbon atoms, CN, COOR in which R is alkyl having 1-4 carbon atoms and alkylsulphone having 1-4 carbon atoms;
is contacted at a temperature of about 0-120° C. with at least a stoichiometric amount of chlorine or a chlorine-yielding agent.

7. A process as claimed in claim 6, wherein the reaction is carried out in the presence of an inert organic solvent.

8. A process as claimed in claim 6, wherein the reaction is carried out in the presence of an inorganic solvent selected from the group consisting of phosphorus trichloride, phosphorus oxychloride and phosphorus sulphochloride.

9. A process according to claim 6, wherein the chlorine yielding agent is a member selected from the group consisting of phosphorus pentachloride, sulphuryl chloride and phosgene.

10. A process according to claim 6, wherein phosphorus trichloride is used as the activator and the reaction is carried out with chlorine.

11. A process according to claim 6, wherein dimethylformamide is used as the activator and phosgene is employed as the chlorinating agent.

References Cited

UNITED STATES PATENTS

| | | | |
|---|---|---|---|
| 3,190,918 | 6/1965 | Holtschmidt | 260—566 |
| 3,301,898 | 1/1967 | Degener et al. | 260—453 X |
| 3,287,102 | 11/1966 | Olin | 260—465 X |

FOREIGN PATENTS 1,141,278  12/1962  Germany.

OTHER REFERENCES

Nef: Annalen der Chemie, Bünde 270, p. 316.
Ottmann et al.: Angewandte Chemie, 77(9) p. 427.

CHARLES B. PARKER, *Primary Examiner.*

S. T. LAWRENCE III, *Assistant Examiner.*

U.S. Cl. X.R.

71—105; 167—30, 31, 32; 260—454